(12) United States Patent
Carvell et al.

(10) Patent No.: US 11,695,361 B2
(45) Date of Patent: Jul. 4, 2023

(54) ELECTRIC MACHINES WITH EFFICIENT TORQUE TRANSITIONS

(71) Applicant: Tula eTechnology, Inc., San Jose, CA (US)

(72) Inventors: Paul Carvell, San Jose, CA (US); Amnish Singh, Fremont, CA (US); Tate Allen Cooper, San Jose, CA (US)

(73) Assignee: Tula eTechnology, Inc., San Jose, CA (US)

( * ) Notice: Subject to any disclaimer, the term of this patent is extended or adjusted under 35 U.S.C. 154(b) by 0 days.

(21) Appl. No.: 17/839,254

(22) Filed: Jun. 13, 2022

(65) Prior Publication Data

US 2022/0399844 A1 Dec. 15, 2022

Related U.S. Application Data

(60) Provisional application No. 63/210,345, filed on Jun. 14, 2021.

(51) Int. Cl.
*H02P 21/00* (2016.01)
*H02P 27/08* (2006.01)

(52) U.S. Cl.
CPC .............. *H02P 21/50* (2016.02); *H02P 27/08* (2013.01)

(58) Field of Classification Search
CPC .. H02P 21/00; H02P 21/0003; H02P 21/0017; H02P 21/0021; H02P 21/0025; H02P 21/02; H02P 21/08; H02P 21/10; H02P 21/14; H02P 21/20; H02P 21/22; H02P 21/30; H02P 23/00; H02P 23/07; H02P 23/14; H02P 23/30; H02P 25/00; H02P 25/022; H02P 25/062; H02P 25/064; H02P 25/092; H02P 25/107; H02P 27/00; H02P 27/04; H02P 27/06; H02P 27/08; H02P 27/12; H02P 6/00; H02P 6/08; H02P 6/28; H02P 220/05; H02P 2205/05
See application file for complete search history.

(56) References Cited

U.S. PATENT DOCUMENTS

| 4,441,043 A | 4/1984 | Decesare |
| 4,989,146 A | 1/1991 | Imajo |
| 5,099,410 A | 3/1992 | Divan |

(Continued)

FOREIGN PATENT DOCUMENTS

| CN | 1829070 A | 9/2006 |
| CN | 102381265 A | 3/2012 |

(Continued)

OTHER PUBLICATIONS

International Search Report from International Application No. PCT/US2022/033241 dated Oct. 11, 2022.

(Continued)

*Primary Examiner* — Antony M Paul
(74) *Attorney, Agent, or Firm* — Beyer Law Group LLP

(57) ABSTRACT

An electric machine is provided. A polyphase machine is provided. A power inverter is electrically connected to the polyphase machine. A controller is electrically connected to the power inverter, wherein the controller provides switching signals to the power inverter, wherein the controller comprises a trajectory calculator that provides an optimized trajectory for transitioning the polyphase machine from a first torque to a second torque.

20 Claims, 4 Drawing Sheets

(56) References Cited

U.S. PATENT DOCUMENTS

| | | | |
|---|---|---|---|
| 5,151,637 | A | 9/1992 | Takada et al. |
| 5,325,028 | A | 6/1994 | Davis |
| 5,483,141 | A | 1/1996 | Uesugi |
| 5,640,073 | A | 6/1997 | Ikeda et al. |
| 5,731,669 | A | 3/1998 | Shimizu et al. |
| 6,291,960 | B1 | 9/2001 | Crombez |
| 6,308,123 | B1 | 10/2001 | Ikegaya et al. |
| 6,370,049 | B1 | 4/2002 | Heikkila |
| 6,424,799 | B1 | 7/2002 | Gilmore |
| 6,493,204 | B1 | 12/2002 | Glidden et al. |
| 6,605,912 | B1 | 8/2003 | Bharadwaj et al. |
| 6,829,515 | B2 | 12/2004 | Grimm |
| 6,829,556 | B2 | 12/2004 | Kumar |
| 6,906,485 | B2 | 6/2005 | Hussein |
| 6,940,239 | B2 | 9/2005 | Iwanaga et al. |
| 7,190,143 | B2 | 3/2007 | Wei et al. |
| 7,259,664 | B2 | 8/2007 | Cho et al. |
| 7,327,545 | B2 | 2/2008 | Konishi |
| 7,411,801 | B2 | 8/2008 | Welchko et al. |
| 7,453,174 | B1 | 11/2008 | Kalsi |
| 7,558,655 | B2 | 7/2009 | Garg et al. |
| 7,577,511 | B1 | 8/2009 | Tripathi et al. |
| 7,616,466 | B2 | 11/2009 | Chakrabarti et al. |
| 7,768,170 | B2 | 8/2010 | Tatematsu et al. |
| 7,852,029 | B2 | 12/2010 | Kato et al. |
| 7,960,888 | B2 | 6/2011 | Ai et al. |
| 7,969,341 | B2 | 6/2011 | Robbe et al. |
| 8,004,227 | B2 | 8/2011 | Kley et al. |
| 8,020,651 | B2 | 9/2011 | Zillmer et al. |
| 8,099,224 | B2 | 1/2012 | Tripathi et al. |
| 8,768,563 | B2 | 7/2014 | Nitzberg et al. |
| 8,773,063 | B2 | 7/2014 | Nakata |
| 9,046,559 | B2 | 6/2015 | Lindsay et al. |
| 9,050,894 | B2 | 6/2015 | Banerjee et al. |
| 9,308,822 | B2 | 4/2016 | Matsuda |
| 9,495,814 | B2 | 11/2016 | Ramesh |
| 9,512,794 | B2 | 12/2016 | Serrano et al. |
| 9,630,614 | B1 | 4/2017 | Hill et al. |
| 9,641,119 | B2 * | 5/2017 | Emadi .................. H02P 25/098 |
| 9,702,420 | B2 | 7/2017 | Yoon |
| 9,758,044 | B2 | 9/2017 | Gale et al. |
| 9,948,173 | B1 | 4/2018 | Abu Qahouq |
| 10,060,368 | B2 | 8/2018 | Pirjaberi et al. |
| 10,081,255 | B2 | 9/2018 | Yamada et al. |
| 10,256,680 | B2 | 4/2019 | Hunstable |
| 10,273,894 | B2 | 4/2019 | Tripathi |
| 10,291,168 | B2 | 5/2019 | Fukuta |
| 10,291,174 | B2 | 5/2019 | Irie et al. |
| 10,320,249 | B2 | 6/2019 | Okamoto et al. |
| 10,340,821 | B2 | 7/2019 | Magee et al. |
| 10,344,692 | B2 | 7/2019 | Nagashima et al. |
| 10,381,968 | B2 | 8/2019 | Agirman |
| 10,476,421 | B1 | 11/2019 | Khalil et al. |
| 10,550,776 | B1 | 2/2020 | Leone et al. |
| 10,742,155 | B2 | 8/2020 | Tripathi |
| 10,763,772 | B1 | 9/2020 | Fatemi et al. |
| 10,944,352 | B2 | 3/2021 | Mazda et al. |
| 11,077,759 | B1 | 8/2021 | Srinivasan |
| 11,088,644 | B1 | 8/2021 | Carvell |
| 11,133,763 | B1 | 9/2021 | Islam |
| 11,133,767 | B2 | 9/2021 | Serrano et al. |
| 11,167,648 | B1 | 11/2021 | Carvell et al. |
| 11,228,272 | B2 | 1/2022 | Tripathi |
| 2001/0039926 | A1 | 11/2001 | Kobayashi et al. |
| 2002/0043954 | A1 | 4/2002 | Hallidy et al. |
| 2005/0127861 | A1 | 6/2005 | McMillan et al. |
| 2005/0151437 | A1 | 7/2005 | Ramu |
| 2005/0160771 | A1 | 7/2005 | Hosoito et al. |
| 2007/0216345 | A1 | 9/2007 | Kanamori |
| 2007/0287594 | A1 | 12/2007 | DeGeorge et al. |
| 2008/0129243 | A1 | 6/2008 | Nashiki |
| 2008/0179980 | A1 | 7/2008 | Dawsey et al. |
| 2009/0045691 | A1 | 2/2009 | Ichiyama |
| 2009/0121669 | A1 | 5/2009 | Hanada |
| 2009/0128072 | A1 | 5/2009 | Strong et al. |
| 2009/0146615 | A1 | 6/2009 | Zillmer et al. |
| 2009/0179608 | A1 | 7/2009 | Welchko et al. |
| 2009/0306841 | A1 | 12/2009 | Miwa et al. |
| 2010/0010724 | A1 | 1/2010 | Tripathi et al. |
| 2010/0201294 | A1 | 8/2010 | Yuuki et al. |
| 2010/0296671 | A1 | 11/2010 | Khoury et al. |
| 2011/0029179 | A1 | 2/2011 | Miyazaki et al. |
| 2011/0089774 | A1 | 4/2011 | Kramer |
| 2011/0101812 | A1 | 5/2011 | Finkle et al. |
| 2011/0130916 | A1 | 6/2011 | Mayer |
| 2011/0208405 | A1 | 8/2011 | Tripathi et al. |
| 2012/0056569 | A1 | 3/2012 | Takamatsu et al. |
| 2012/0112674 | A1 | 5/2012 | Schulz et al. |
| 2012/0169263 | A1 | 7/2012 | Gallegos-Lopez et al. |
| 2012/0217916 | A1 | 8/2012 | Wu et al. |
| 2012/0217921 | A1 | 8/2012 | Wu et al. |
| 2013/0134912 | A1 | 5/2013 | Khalil et al. |
| 2013/0141027 | A1 | 6/2013 | Nakata |
| 2013/0226420 | A1 | 8/2013 | Pedlar et al. |
| 2013/0241445 | A1 | 9/2013 | Tang |
| 2013/0258734 | A1 | 10/2013 | Nakano et al. |
| 2014/0018988 | A1 | 1/2014 | Kitano et al. |
| 2014/0028225 | A1 | 1/2014 | Takamatsu et al. |
| 2014/0130506 | A1 | 5/2014 | Gale et al. |
| 2014/0176034 | A1 | 6/2014 | Matsumura et al. |
| 2014/0217940 | A1 | 8/2014 | Kawamura |
| 2014/0265957 | A1 | 9/2014 | Hu et al. |
| 2014/0292382 | A1 | 10/2014 | Ogawa et al. |
| 2014/0354199 | A1 | 12/2014 | Zeng et al. |
| 2015/0025725 | A1 | 1/2015 | Uchida |
| 2015/0240404 | A1 | 8/2015 | Kim et al. |
| 2015/0246685 | A1 | 9/2015 | Dixon et al. |
| 2015/0261422 | A1 | 9/2015 | Den et al. |
| 2015/0297824 | A1 | 10/2015 | Cabiri et al. |
| 2015/0318803 | A1 | 11/2015 | Wu et al. |
| 2016/0114830 | A1 | 4/2016 | Dixon et al. |
| 2016/0226409 | A1 | 8/2016 | Ogawa |
| 2016/0233812 | A1 | 8/2016 | Lee et al. |
| 2016/0269225 | A1 | 9/2016 | Kirchmeier et al. |
| 2016/0373047 | A1 | 12/2016 | Loken et al. |
| 2017/0087990 | A1 | 3/2017 | Neti et al. |
| 2017/0163108 | A1 | 6/2017 | Schencke et al. |
| 2017/0331402 | A1 | 11/2017 | Smith et al. |
| 2018/0032047 | A1 | 2/2018 | Nishizono et al. |
| 2018/0045771 | A1 | 2/2018 | Kim et al. |
| 2018/0154786 | A1 | 6/2018 | Wang et al. |
| 2018/0276913 | A1 | 9/2018 | Garcia et al. |
| 2018/0323665 | A1 | 11/2018 | Chen et al. |
| 2018/0334038 | A1 | 11/2018 | Zhao et al. |
| 2019/0058374 | A1 | 2/2019 | Enomoto et al. |
| 2019/0288629 | A1 | 9/2019 | Tripathi |
| 2019/0288631 | A1 | 9/2019 | Tripathi |
| 2019/0341820 | A1 | 11/2019 | Krizan et al. |
| 2020/0212834 | A1 | 7/2020 | Mazda et al. |
| 2020/0262398 | A1 | 8/2020 | Sato et al. |
| 2020/0328714 | A1 | 10/2020 | Tripathi |
| 2020/0343849 | A1 | 10/2020 | Coroban-Schramel |
| 2020/0366223 | A1 | 11/2020 | Coroban-Schramel |
| 2021/0146909 | A1 | 5/2021 | Serrano et al. |
| 2021/0203263 | A1 | 7/2021 | Serrano et al. |
| 2021/0351733 | A1 | 11/2021 | Carvell |

FOREIGN PATENT DOCUMENTS

| | | |
|---|---|---|
| CN | 104716754 A | 6/2015 |
| CN | 204589885 U | 8/2015 |
| CN | 105196877 A | 12/2015 |
| CN | 205229379 U | 5/2016 |
| CN | 106932208 A | 7/2017 |
| CN | 107067780 A | 8/2017 |
| CN | 207129052 U | 3/2018 |
| CN | 108216026 A | 6/2018 |
| CN | 108445386 A | 8/2018 |
| CN | 110212725 | 9/2019 |
| DE | 102014206342 | 10/2015 |
| EP | 2605398 A1 | 6/2013 |
| EP | 2034606 | 3/2015 |
| FR | 2989479 | 10/2013 |
| GB | 2273212 | 8/1994 |

(56) References Cited

FOREIGN PATENT DOCUMENTS

| JP | 10243680 | 9/1998 |
|---|---|---|
| JP | 2008-079686 A | 4/2008 |
| JP | 2009-065758 A | 3/2009 |
| JP | 2011-67043 | 3/2011 |
| JP | 2014-033449 A | 2/2014 |
| JP | 2017-011970 A | 1/2017 |
| JP | 2017-200382 | 11/2017 |
| JP | 2018-033250 A | 3/2018 |
| KR | 10-2017-0021146 A | 2/2017 |
| KR | 10-2017-0032976 A | 3/2017 |
| WO | WO03/36787 A1 | 5/2003 |
| WO | WO2012-010993 A2 | 1/2012 |

OTHER PUBLICATIONS

Cai et al., "Torque Ripple Reduction for Switched Reluctance Motor with Optimized PWM Control Strategy", https://www.mdpi.com/1996-1073/11/11/3215, Oct. 15, 2018, 27 pages.

Spong et al., "Feedback Linearizing Control of Switched Reluctance Motors", IEEE Transactions on Automatic Control, vol. AC-32, No. 5, May 1987, pp. 371-379.

Mirzaeva et al., "The use of Feedback Quantizer PWM for Shaping Inverter Noise Spectrum", Power Electronics and Motion Control Conference (EPE/PEMC), 2012 $15^{th}$ International IEEE, Sep. 4, 2012, pp. DS3c. 10-1, XP032311951, DOI: 10.1109/EPEPEMC.2012.6397346, ISBN: 978-1-4673-1970.6.

Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.

Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.

Srinivasan, U.S. Appl. No. 17/158,230, filed Jan. 26, 2021.

\* cited by examiner

ELECTRIC MACHINES WITH EFFICIENT TORQUE TRANSITIONS

CROSS-REFERENCE TO RELATED APPLICATION

This application claims the benefit of priority of U.S. Application No. 63/210,345, filed Jun. 14, 2021, which is incorporated herein by reference for all purposes.

BACKGROUND

The present application relates generally to electric machines.
The term "machine" as used herein is intended to be broadly construed to mean both electric motors and generators. Electric motors and generators are structurally very similar. Both include a stator having a number of poles and a rotor. When a machine is operating as a motor, it converts electrical energy into mechanical energy. When operating as a generator, the machine converts mechanical energy into electrical energy.

SUMMARY

To achieve the foregoing and in accordance with the purpose of the present disclosure, an electric machine is provided. A polyphase machine is provided. A power inverter is electrically connected to the polyphase machine. A controller is electrically connected to the power inverter, wherein the controller provides switching signals to the power inverter, wherein the controller comprises a trajectory calculator that provides an optimized trajectory for transitioning the polyphase machine from a first torque to a second torque.

In another manifestation, a method for transitioning a polyphase machine from a first torque level to a second torque level, where the polyphase machine is controlled by a controller is provided. An optimized trajectory from the controller is provided to the polyphase machine, wherein the optimized trajectory provides an optimized trajectory for transitioning the polyphase machine from the first torque level to the second torque level.

These and other features of the present disclosure will be described in more detail below in the detailed description and in conjunction with the following figures.

BRIEF DESCRIPTION OF THE DRAWINGS

The invention and the advantages thereof may best be understood by reference to the following description taken in conjunction with the accompanying drawings in which.

DETAILED DESCRIPTION OF THE PREFERRED EMBODIMENTS

Figure 1:
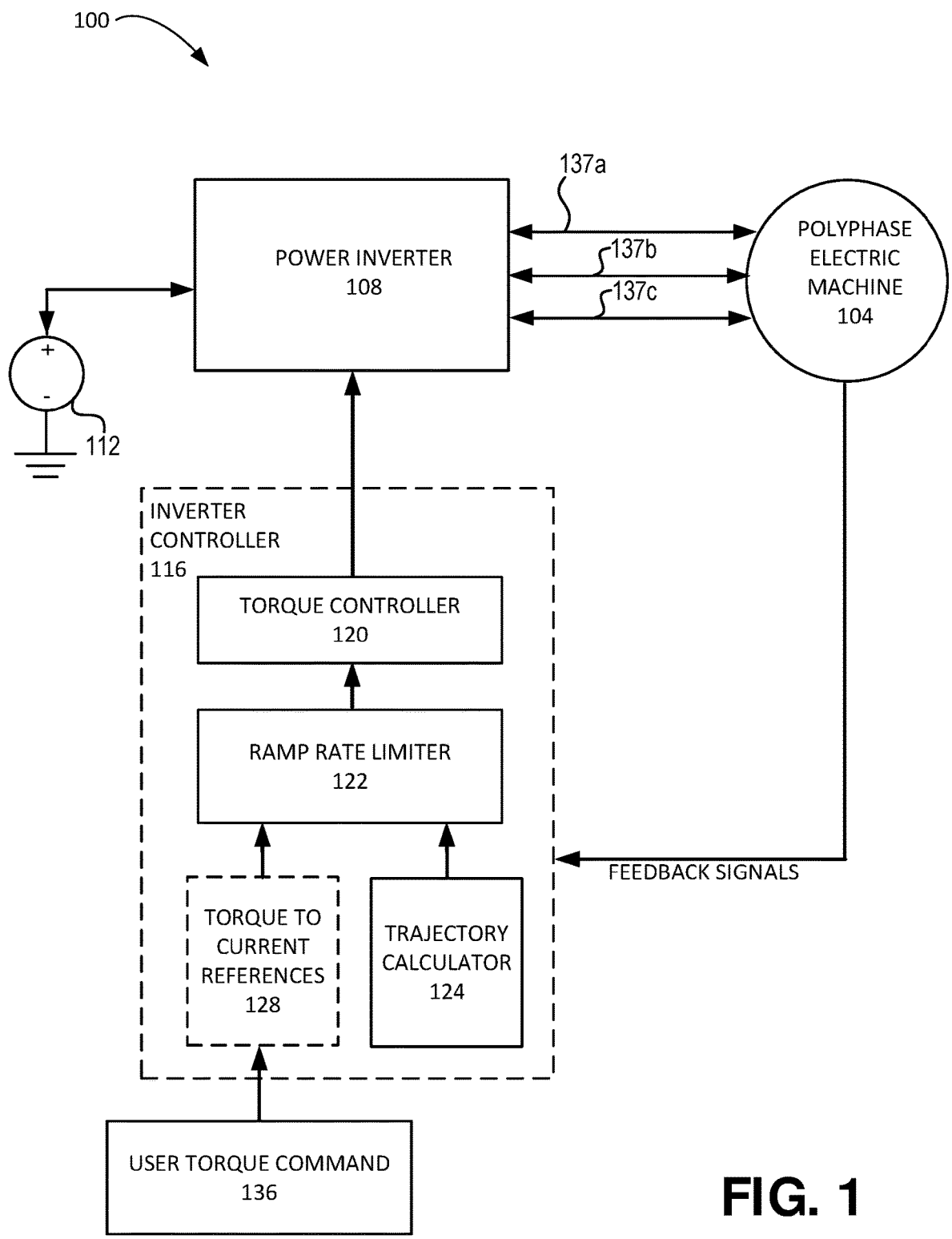
FIG. 1 is a schematic view of an electric machine in accordance with some embodiments.

Modern electric machines have relatively high energy conversion efficiencies. The energy conversion efficiency of most electric machines, however, can vary considerably based on their operational load. With many applications, a machine is required to operate under a wide variety of different operating load conditions. In addition, the torque provided by an electric machine may vary over operation requiring a variation from a first torque to a second torque. The first torque may be a first torque level and the second torque may be a second torque level.

Most electric machines (motors and generators) are controlled to deliver the highest efficiency under steady state conditions with no consideration for transient periods. Also, for high bandwidth torque controllers, minimum possible transient periods are desired which mostly leads to suboptimal control due to controller output saturation.

A study of torque transitions indicates that most if not all electric motor control laws simply try to transition the torque as fast as possible. Most Multiple Input Multiple Output (MIMO) torque controllers for polyphase motors either under-utilize the bus voltage or saturate the controller outputs that lead to sub-optimal control during the transient. Under-utilization of the bus voltage leads to slow torque response, but uncontrolled controller saturation leads to fast response but at low efficiencies. Therefore, a solution is needed that maximizes controller output to ensure the fastest possible transition time whilst maximizing the efficiency during that transition time.

Typically, for a MIMO system such as a polyphase electric motor, controller gains are tuned such that the controller output remains within the bounds of the system capability such as the bus voltage and current limits of the inverter. In such a scenario, the bus voltage is underutilized if the controller is linear. However, an over-tuned torque controller and many other high bandwidth controllers including non-linear ones tend to saturate the output thereby fully utilizing the bus voltage during a transient. However, the trajectory of the power applied to the motor does not follow an optimal relationship as defined by Maximum Torque Per Amp (MTPA), Maximum Torque Per Loss (MTPL), Maximum Torque Per Flux (MTPF), or Maximum Torque Per Volt (MTPV) control strategies during such saturation. In essence, most techniques currently used trade torque performance against transient efficiency to a large degree.

Some embodiments deal with maximizing transient efficiency with minimum possible transient times by maximizing bus voltage utilization and ensuring that torque trajectory remains on at least one of a MTPA, MTPL, MTPF, or MTPV path during the torque transient for any polyphase electric motor. Various embodiments use different approaches/techniques that can achieve such performance. In some examples, three techniques of many possible techniques are described to demonstrate some embodiments of this invention, where the three techniques are described below:

1) Optimal Torque Rate Limiting for Maximum Bus Voltage Utilization.
2) Optimal $I_d$/Iq Rate Limiting/Voltage Angle for Maximum Bus Voltage Utilization.
3) Open Loop $I_q$ Control with $I_q$ Feedback as $I_d$ Reference when the Q axis time constant is greater than the D axis time constant. When the D axis time constant is greater than the Q axis time constant then an Open Loop $I_d$ control with $I_d$ feedback is as $I_q$ Reference is used.

All three methods make full use of the bus voltage used during the torque transient and share the bus voltage optimally between the D axis and Q axis resulting in max efficiency. In some embodiments, a computer optimization algorithm may be used to determine path optimized trajectories.

The first method relies on calculating the maximum torque achievable in the next sampling period i.e., T[k+1]. Such a controller requires a high bandwidth inverse model controller such as a deadbeat controller. It can work either with a direct torque flux control loop or $I_d/I_q$ current vector control.

Consider a case of a synchronous reluctance motor. Voltages Vd, Vq, and therefore vector magnitude Vs can be computed as follows.

$$V_d[k] = I_d[k]R_s + \frac{L_d}{T_s}(I_d[k+1] - I_d[k]) - \omega_e L_q I_q[k];$$

$$V_q[k] = I_q[k]R_s + \frac{L_q}{T_s}(I_q[k+1] - I_q[k]) + \omega_e L_d I_d[k];$$

$$V_s[k] = \sqrt{V_d[k]^2 + V_q[k]^2}$$

where [k] is the Sampling Instance $k^{th}$, $I_d$ is the Direct Axis Stator Current, $I_q$ is Quadrature Axis Stator Current, $L_d$ is Direct Axis Stator Inductance, $L_q$ is Quadrature Axis Stator Inductance, $V_d$ is Direct Axis Stator Voltage, $V_q$ is Quadrature Axis Stator Voltage, $V_s$ is Stator Voltage Vector Magnitude, $\omega_e$ is Rotor Electrical Frequency, rad/s, and $R_s$ is Per Phase Stator Resistance, ohms.

Id/Iq references can be computed as functions of torque, rpm, and bus voltage can be derived using MTPA, MTPL, or MTPV equations or a lookup table (LUT) that satisfy these equations.

$I_d[k]=f_1(\text{rpm}[k],V_{bus}[k],\tau[k]);$ $I_q[k]=f_2(\text{rpm}[k],V_{bus}[k],\tau[k]);$ $I_d[k+1]=f_1(\text{rpm}[k+1],V_{bus}[k+1],\tau[k+1]);$ $I_q[k+1]=f_2(\text{rpm}[k+1],V_{bus}[k+1],\tau[k+1]);$ where [k+1] is the Sampling Instance $(k+1)^{th}$, $V_{bus}$ is DC Bus Voltage Available to Power Inverter, Since rotations per minute (RPM) and Vbus do not change significantly in one sampling time, Torque[k+1] can be swept between Min and Max torque from which Id[k], Iq[k], Id[k+1], Iq[k+1] can be used to derive Vs[k]. The value of Torque[k+1] must be chosen for the controller which satisfies Vs[k]=Vmax. In this manner, Vs is maximized while satisfying MTPA, MTPL, or MTPV conditions using the f1( ) and f2( ) functions above. Torque[k+1] can then be used to rate limit the torque command.

Such optimal Torque[k+1] selection can be either done using real-time manual sweep and search algorithms like binary search or using 3-D LUT taking rpm[k], $V_{bus}$ [k], τ[k] as inputs.

The second method relies on calculating optimal voltage angle and voltage magnitude that satisfies MTPA, MTPL, or MTPV when Vs=Vmax. Consider the voltage equation for Synchronous Reluctance Motor in discrete state space form when Vs is set to Vmax.

$$I_d[k+1] = T_s I_d[k] + \frac{1}{L_d}(V_{max}\cos(\phi_v) - I_d[k]R_s + \omega_e L_q I_q[k]);$$

$$I_q[k+1] = T_s I_q[k] + \frac{1}{L_q}(V_{max}\sin(\phi_v) - I_q[k]R_s - \omega_e L_d I_d[k]);$$

where $\phi_v$ is Stator Voltage Vector Angle referred to Direct Axis and $V_{max}$ is Maximum Allowed Stator Voltage Vector Magnitude.

If $\phi_v$ is swept from 0° to 360°, then $I_d$ [k+1] and $I_q$ [k+1] can be plotted against $\phi_v$. Value of $\phi_v$ is chosen where $I_d$ [k+1] and $I_q$ [k+1] satisfy MTPA, MTPL or MTPV condition. At this point, either $I_d$ [k+1] and $I_q$ [k+1] can be used to rate limit commands to the deadbeat controller or $\phi_v$ can be used directly to compute $V_d$ [k] and $V_q$ [k] for the controller output during transient.

If the D axis has a higher time constant than the Q axis, then the third method uses Proportional Integral controller and the fact that the time constant of the D axis has a higher time constant than the Q axis, and therefore, applies full voltage to the slow time constant axis initially and allows $I_d$ to ramp up limited only by the motor time constant. $I_d$ feedback is then utilized to generate $I_q$ reference using optimal MTPA, MTPV, or MTPL tables. The output of the Q-axis control loop then perturbs the voltage angle away from D-axis so, that the voltage is optimally shared between the two axes. If the Q axis has a higher time constant than the D axis, then the third method uses Proportional Integral controller and the fact that the time constant of the Q axis has a higher time constant than the D axis, and therefore, applies full voltage to the slow time constant axis initially and allows $I_q$ to ramp up limited only by the motor time constant. $I_q$ feedback is then utilized to generate $I_d$ reference using optimal MTPA, MTPV, or MTPL tables. The output of the D-axis control loop then perturbs the voltage angle away from Q-axis so, that the voltage is optimally shared between the two axes.

Computer optimization algorithms can be used to help define the optimal path for both $I_d$ and $I_q$ during the torque transition for any desired trajectory including MTPA, MTPV and MTPL. The result of this may be a Look Up Table (LUT) or a mathematical equation that can be processed real time in the controller. In some embodiments, the computer optimization algorithms may be at least one of numerical optimization, dynamic programming, and model predictive control. In various embodiments the computer optimization algorithm may be used online or offline. When used offline, a LUT may be generated by the computer optimization algorithm.

In some embodiments using numerical optimization, an ordinary differential equation (ODE) solver is used along with a motor model in a differential equation format to provide an estimate of how the model states will change over time when the control inputs are applied at each step. With each ODE solution, a cost can be calculated to penalize or reward some goal, such as following a torque target, while also constraining signals or states within rounds. If such an optimization is not able to be done in real time, the optimization may be calculated ahead of time and stored in a LUT. In an example of a numerical optimization, a cost function of objective to be met over a specified period of time is provided. Initial values are specified for control inputs, such as voltages. In some embodiments, the control inputs may be two or more of $V_d$, $V_q$, voltage magnitude, and voltage angle. In this example, the ODE is solved assuming voltage inputs are applied at each time. In this example, cost is calculated based on ODE results. In some embodiments, the Cost (J) can be a single function or any sum of multiple costs. Practical cost functions may reward the ability to follow the torque trajectory, or reward increasing valuable statistics such as torque per unit current or be barrier functions which penalize violating of constraints such as bus voltage or armature current limits. Cost functions can change over time, or over multiple iterations, which is an important aspect of using boundary functions. Value of voltage inputs are iterated over time and are terminated at some condition, yielding cost optimal vectors for control inputs. In some embodiments, The ODE is solved and optimized over one time step, then the next, etc. Once completed, all the trajectories can be concatenated together to come up with an optimal long term cost.

In some embodiments, dynamic programming may also be used to derive a cost optimal trajectory. The differential equation problem would be converted from a problem of numerical integration to one of selecting transitions between states in time, where each transition has a certain cost associated with it. By representing the problem as a series of paths from desired end state to beginning, dynamic programming may be used to select a cost optimal path, and therefore a cost optimal trajectory of states and inputs. This method takes advantage of the Principle of Optimality due to its structure.

Economic Model Predictive Control could be setup using parts of the direct optimization method. The "Economic" aspect being that the "cost" being used to solve this problem will be an arbitrary cost function, rather than one of the ODE states such as current or flux. An ODE problem would still be solved, and a cost with possible constraints would still be calculated based on the ODE result, but the number of elements optimized for the problem would be limited to the first few time steps, with the last input held for remaining time. This ensures that the long-term trajectory is cost optimal and constrained, but the problem is small enough to be solved quickly. A larger, offline solution could be constructed by solving the Model Predictive Control problem and saving the first control inputs for each time step.

Current techniques either deliver torque response performance with poor transient efficiencies or limit the rate of change of the torque demand such that the control stays within the voltage limitation. Some embodiments optimize the torque transient period. Some embodiments deliver high efficiencies during the transient periods with minimum possible transient periods. Some embodiments assume quasi-steady state behavior during transient due to the time constants being longer than the sampling time and force the system to transition through the most optimal state trajectory to ensure efficiency maximization.

Some embodiments have the potential to increase the efficiency of any electric motor control not just torque controlled motors as used in the traction industry and therefore complementary to the existing control strategy employed.

FIG. 1 is a block diagram of an electric machines system 100 that may be used in some embodiments. The electric machine system 100 comprises a polyphase electric machine 104, a power inverter 108, a power source 112, and an inverter controller 116. In the specification and claims, the polyphase electric machine 104 may be a polyphase motor or a polyphase generator. Therefore, in the specification and claims, the power inverter 108 is a power converter for either a polyphase motor or a polyphase generator. Such a power inverter 108 may also be called a power rectifier. In some embodiments, the power source 112 is a DC power source. One or more feedback signals are provided from the polyphase electric machine 104 to the inverter controller 116.

In some embodiments, the inverter controller 116 may be located within the power inverter 108. In some embodiments, the inverter controller 116 may be outside of or separate from the power inverter 108. In some embodiments, part of the inverter controller 116 may be within the power inverter 108 and part of the inverter controller 116 may be outside of or separate from the power inverter 108. In some embodiments, the inverter controller 116 comprises a torque controller 120, a ramp rate limiter 122, a trajectory calculator 124, and a torque to current references converter 128. In some embodiments, the inverter controller 116 does not have a torque to current references converter 128. In such embodiments, the user torque command 136 may be provided directly to the ramp rate limiter 122. In some embodiments, the inverter controller 116 provides switching signals to the power inverter 108. In some embodiments, the switching signal control machine excitation causes the electric machine to follow an optimized trajectory so that the electric machine minimizes losses going from first torque to second torque.

In some embodiments, where the polyphase electric machine 104 is operated as a 3 phase motor, the power inverter 108 is responsible for generating three-phase AC power from the DC power supply 112 to drive the polyphase electric machine 104. The three-phase input power, denoted as phase A 137a, phase B 137b, and phase C 137c, is applied to the windings of the stator of the polyphase electric machine 104 for generating a rotating magnetic field. The lines depicting the various phases, 137a, 137b, and 137c are depicted with arrows on both ends indicating that current can flow both from the power inverter 108 to the polyphase electric machine 104 when the machine is used as a 3 phase motor and that current can flow from the polyphase electric machine 104 to the power inverter 108 when the polyphase electric machine 104 is used as a generator. When the polyphase electric machine 104 is operating as a generator, the power inverter 108 operates as a power rectifier, and the AC power coming from the polyphase electric machine 104 is converted to DC power being stored in the DC power supply 112.

Figure 2:
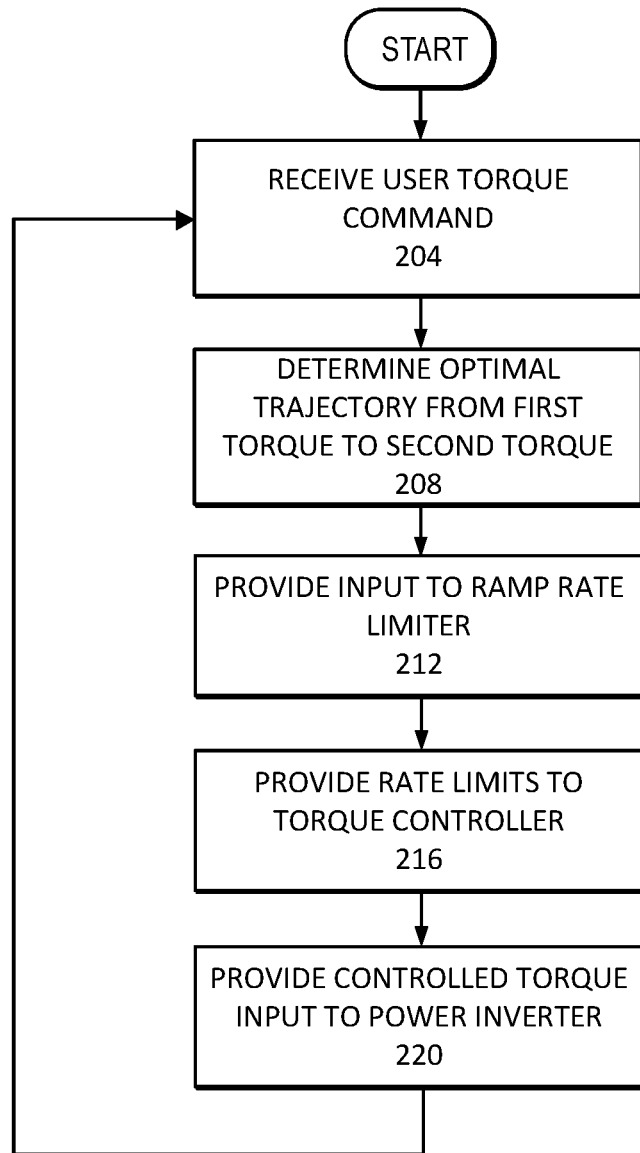
FIG. 2 is a high level flow chart that is used in some embodiments.

FIG. 2 is a flow chart of a process that may be used in some embodiments. In some embodiments, a user torque command is received by the inverter controller 116 (step 204). In an example, the user torque command requests that the torque provided by the polyphase electric machine 104 transitions from a first torque to a second torque. In some embodiments, the trajectory calculator 124 provides an optimized trajectory from the first torque to the second torque (step 208). In some embodiments, the optimized torque trajectory is expressed by a series of volt or current commands to provide a voltage or current path. Optimized torque trajectory information is provided to the ramp rate limiter 122 (step 212). The ramp rate limiter provides rate limit information to the torque controller 120 (step 216). A controlled torque input is provided to the power inverter 108 (step 220) in order to provide an optimized trajectory to the polyphase electric machine 104.

In some embodiments, trajectory calculator 124 calculates an optimized trajectory using at least one of the MTPA, MTPL, MTPF, or MTPV control strategies to calculate an optimized trajectory. In some embodiments, an optimized trajectory is determined using at least one of 1) Optimal Torque Rate Limiting for Maximum Bus Voltage Utilization, Optimal $I_d/I_q$ Rate Limiting/Voltage Angle for Maximum Bus Voltage Utilization, and Open Loop Iq Control with Iq Feedback as Id Reference. In some embodiments, some of the above methods are used to create a lookup table (LUT). The lookup table may provide the first torque and second torque as inputs and stored values in the lookup table identified by the first torque and second torque are then provided from the lookup table. In some embodiments, computer optimization using optimization algorithms may be used to determine the optimized trajectory.

Figure 3:
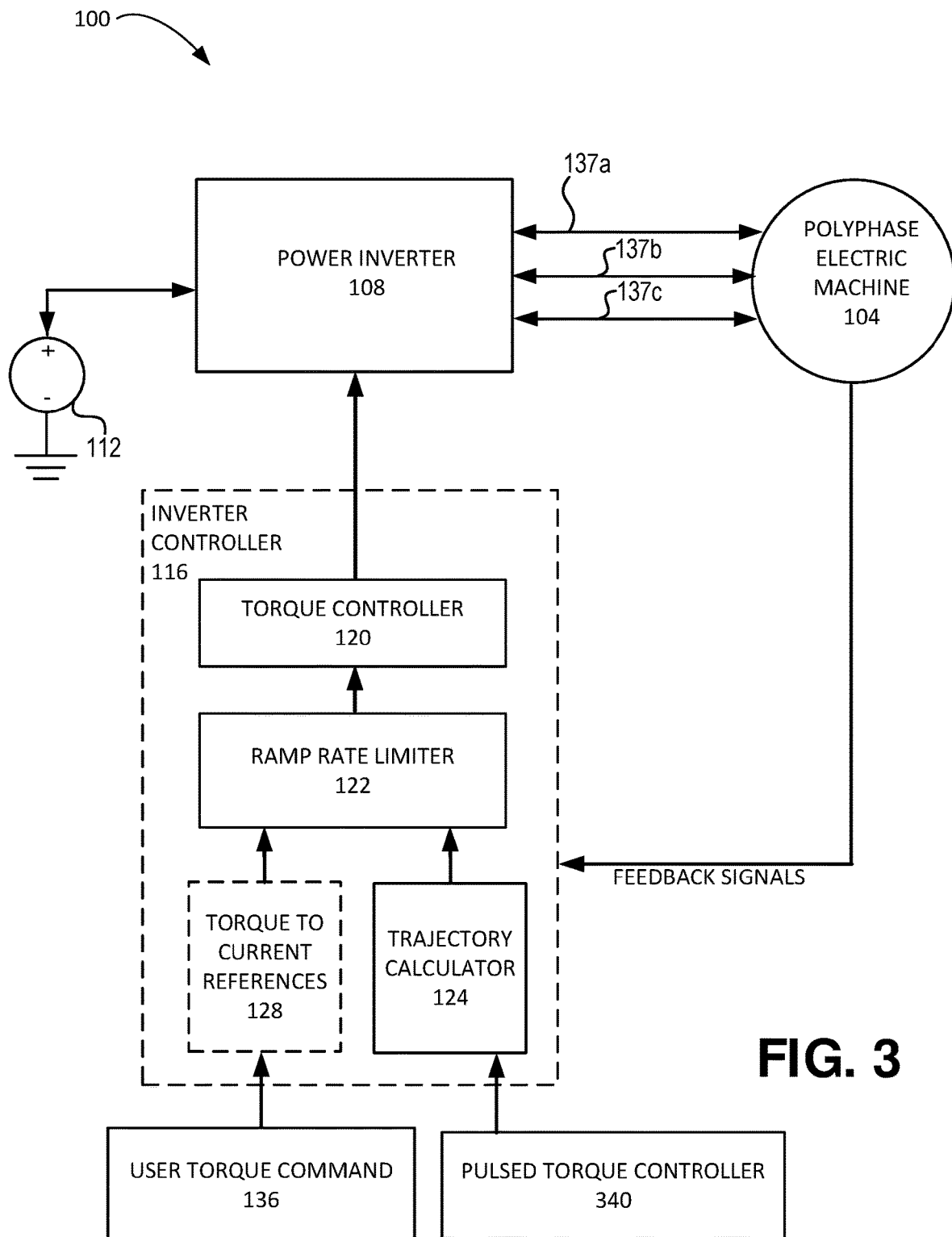
FIG. 3 is a schematic view of an electric machine in accordance with some embodiments with a pulsed torque.

FIG. 3 is a schematic illustration of the electric machine system 100, shown in FIG. 1, but with the addition of a pulsed torque controller used in a pulsed electric machine system. Examples of such pulsed torque electric machines are described in U.S. Pat. No. 10,742,155 filed on Mar. 14, 2019, U.S. patent application Ser. No. 16/353,159 filed on Mar. 14, 2019, and U.S. Provisional Patent Application Nos. 62/644,912, filed on Mar. 19, 2018; 62/658,739, filed on Apr. 17, 2018; and 62/810,861 filed on Feb. 26, 2019. Each of the foregoing applications or patents is incorporated herein by reference for all purposes in their entirety. In such applications, the torque level transitions occur very frequently (potentially many times a second) and efficient transition control enables even higher efficiency operation. In some embodiments, the pulsed torque controller 340 provides pulsed torque commands to the trajectory calculator 124. In some embodiments, the first and second torque levels and period pulses provide an overall average output having a higher energy conversion efficiency than the system would have when operating in a continuous manner to deliver the same average output. In addition, in some embodiments, the pulse period may be chosen to minimize or reduce noise, vibration, and hardness.

Figure 4:
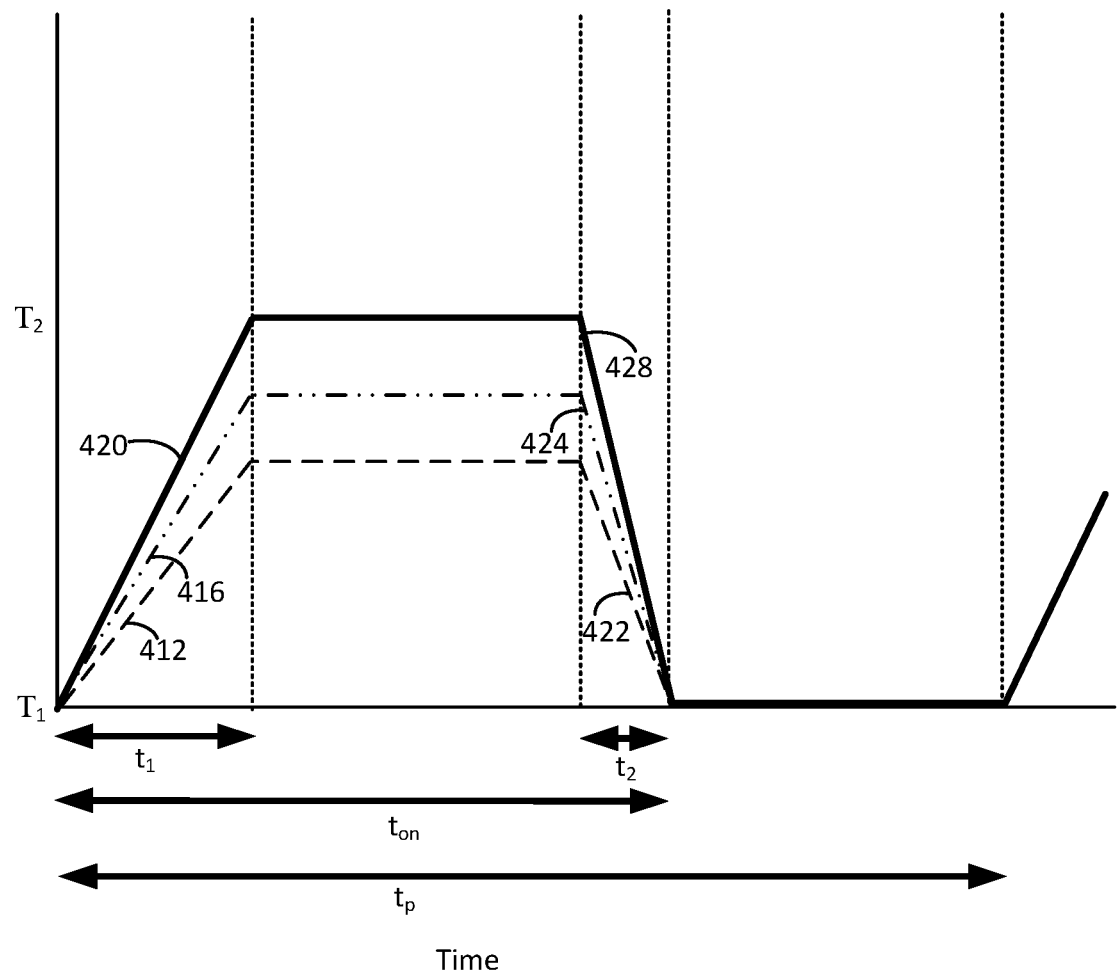
FIG. 4 is a graph illustrating the improvement provided by some embodiments.
In the drawings, like reference numerals are sometimes used to designate like structural elements. It should also be appreciated that the depictions in the figures are diagrammatic and not to scale.

FIG. 4 is a graph of torque or current with respect to time, illustrating a current trajectory that may be used in some embodiments which use a pulsed periodic torque operation. In this example, the torque is pulsed between a first torque $T_1$ to a second torque $T_2$ with a period of $t_p$. In some embodiments, the pulsed torque is provided by the pulsed torque commands or signals from the pulsed torque controller 340. In some embodiments, the first torque $T_1$ has a magnitude of zero. In this example, the trajectory calculator 124 provides an optimized trajectory for the optimal torque to go from the first torque $T_1$ to the second torque $T_2$, as shown in FIG. 3. The trajectory provides an $I_q$ ramp 412 and an $I_d$ ramp 416 that are used to provide a torque ramp 420 from the first torque $T_1$ to the second torque $T_2$ over a time period $t_1$. The torque may be maintained at the second torque $T_2$ for a period of time. The torque command may then request that the torque be ramped down from the second torque $T_2$ to the first torque $T_1$. The trajectory provides an $I_q$ ramp 422 and an $I_d$ ramp 424 that are used to provide an optimal torque ramp 428 from the second torque $T_2$ to the first torque $T_1$ over a time period $t_2$. The torque may be maintained at the first torque $T_1$ for a period of time until a pulse period $t_p$ is completed.

In some embodiments, the trajectories of $I_q$ ramp 412 and an $I_d$ ramp 416 provide an increased efficiency. Some prior art systems attempt to provide a vertical current ramp in order to attempt to provide a vertical torque ramp from the first torque $T_1$ to the second torque $T_2$. In such prior art embodiments, the controller outputs are uncontrolled saturated outputs that lead to a fast response with low efficiencies. In other prior art devices, a very slow ramping process may be provided, resulting in an under-utilization of bus voltage leads resulting in low efficiencies and slow torque response. Therefore, the optimized trajectory prevents saturated outputs and under-utilization of the bus voltage and therefore provides an improved efficiency.

In some embodiments, the pulse period $t_p$ is half of a second so that the torque may be transitioned between the first torque $T_1$ and the second torque $T_2$ several times each second. In some embodiments, the pulse period $t_p$ is less than a second. In some embodiments using pulsed torques provide improved efficiencies several times each second.

By providing an optimized trajectory, the transition from the first torque to the second torque is accomplished more efficiently at a reduced power usage. Some embodiments provide maximum efficiency between torque transitions. In addition, some embodiments ensure that the power transferred to the motor shaft is maximized during torque transitions. Some embodiments, optimize torque performance by fully utilizing the available voltage and current during the transition between a first torque and a second torque. A reduction in power usage in an electric machine that is a motor increases the range of the motor at a given power source capacity. A reduction in power usage in an electric machine that is a generator allows more power to be provided to the DC power supply 112.

In various embodiments, polyphase machines may include but are not limited to brushless DC (BLDC) machines, permanent magnet synchronous machines (PMSM), interior permanent magnet (IPM) machines, wound rotor synchronous machines, induction machines, and synchronous reluctance machines. In some embodiments, the polyphase machine may have two or more phases. As mentioned above, polyphase machines may be polyphase motors or polyphase generators, or polyphase machines that operate both as motors or generators. In some embodiments, the torque controller 120 may be implemented as different devices, such as a high bandwidth current controller or flux controller.

While this disclosure has been described in terms of several preferred embodiments, there are alterations, modifications, permutations, and various substitute equivalents, which fall within the scope of this disclosure. It should also be noted that there are many alternative ways of implementing the methods and apparatuses of the present disclosure. It is therefore intended that the following appended claims be interpreted as including all such alterations, modifications, permutations, and various substitute equivalents as fall within the true spirit and scope of the present disclosure. As used herein, the phrase "A, B, or C" should be construed to mean a logical ("A OR B OR C"), using a non-exclusive logical "OR," and should not be construed to mean 'only one of A or B or C. Each step within a process may be an optional step and is not required. Different embodiments may have one or more steps removed or may provide steps in a different order. In addition, various embodiments may provide different steps simultaneously instead of sequentially. In addition, elements that are shown and described separately may also be combined in a single device or single step. For example, steps that are described sequentially may be simultaneous. In addition, steps described sequentially in one order may be performed in another order.

What is claimed is:

1. An electric machine, comprising:
   a polyphase machine;
   a power inverter electrically connected to the polyphase machine; and
   a controller electrically connected to the power inverter, wherein the controller receives a user torque command request for the polyphase machine to transition from a first torque to a second torque and wherein the controller provides switching signals to the power inverter, wherein the controller comprises a trajectory calculator that provides an optimized trajectory for transitioning the polyphase machine from the first torque to the second torque.

2. The electric machine, as recited in claim 1, wherein the trajectory calculator provides the optimized trajectory based on at least one of Maximum Torque Per Amp (MTPA), Maximum Torque Per Loss (MTPL), Maximum Torque Per Flux (MTPF), Maximum Torque Per Volt (MTPV), and a computer optimized trajectory.

3. The electric machine, as recited in claim 1, wherein the trajectory calculator uses at least one of at least one of Optimal Torque Rate Limiting for Maximum Bus Voltage Utilization, Optimal Id/Iq Rate Limiting/Voltage Angle for Maximum Bus Voltage Utilization, Open Loop Iq Control with Iq Feedback as Id Reference to provide the optimized trajectory, and any other computer generated optimal trajectory.

4. The electric machine, as recited in claim 3, wherein the trajectory calculator uses a lookup table.

5. The electric machine, as recited in claim 1, wherein the trajectory calculator provides an optimized trajectory that minimizes losses and wherein the electric machine follows the optimized trajectory.

6. The electric machine, as recited in claim 1, wherein the trajectory calculator provides at least one voltage magnitude and at least one voltage vector angle.

7. An electric machine, comprising:
   a polyphase machine;
   a power inverter electrically connected to the polyphase machine;
   a controller electrically connected to the power inverter, wherein the controller provides switching signals to the power inverter, wherein the controller comprises a trajectory calculator that provides an optimized trajectory for transitioning the polyphase machine from a first torque to a second torque; and
   a pulsed torque controller connected to the controller that provides pulsed torque signals to the controller.

8. The electric machine, as recited in claim 7, torque controller provides a pulsed periodic torque operation between the first torque and the second torque with a period of less than one second.

9. The electric machine, as recited in claim 8, wherein the pulsed periodic torque operation provides an overall average system output having a higher energy conversion efficiency during the pulsed periodic torque operation of the electric machine than the electric machine would have when operated at a third torque that would be required to drive the electric machine in a continuous manner to deliver the same average output.

10. The electric machine, as recited in claim 9, wherein the period is a period that provides reduced noise, vibration, and hardness.

11. A method for transitioning a polyphase machine from a first torque level to a second torque level, where the polyphase machine is controlled by a controller, comprising:
   receiving a user torque command request for the polyphase machine to transition from a first torque to a second torque; and
   providing an optimized trajectory from the controller to the polyphase machine, wherein the optimized trajectory provides an optimized trajectory for transitioning the polyphase machine from the first torque level to the second torque level.

12. The method, as recited in claim 11, wherein the controller provides a series of voltages to the polyphase machine in order to provide the optimized trajectory.

13. The method, as recited in claim 11, wherein the optimized trajectory is based on at least one of Maximum Torque Per Amp (MTPA), Maximum Torque Per Loss (MTPL), Maximum Torque Per Flux (MTPF), or Maximum Torque Per Volt (MTPV).

14. The method, as recited in claim 11, wherein the optimized trajectory is provided by at least one of at least one of Optimal Torque Rate Limiting for Maximum Bus Voltage Utilization, Optimal Id/Iq Rate Limiting/Voltage Angle for Maximum Bus Voltage Utilization, Open Loop Iq Control with Iq Feedback as Id Reference, and any other computer generated optimal trajectory.

15. The method, as recited in claim 14, wherein the optimized trajectory that provides reduced noise, vibration, and hardness.

16. The method, as recited in claim 11, wherein the optimized trajectory minimizes losses and wherein the polyphase machine follows the optimized trajectory.

17. A method for transitioning a polyphase machine from a first torque level to a second torque level, where the polyphase machine is controlled by a controller, comprising:
   providing an optimized trajectory from the controller to the polyphase machine, wherein the optimized trajectory provides an optimized trajectory for transitioning the polyphase machine from the first torque level to the second torque level, wherein the controller provides a series of voltages to the polyphase machine in order to provide the optimized trajectory, wherein the controller further provides a vector voltage angle.

18. A method for transitioning a polyphase machine from a first torque level to a second torque level, where the polyphase machine is controlled by a controller, comprising:
   providing an optimized trajectory from the controller to the polyphase machine, wherein the optimized trajectory provides an optimized trajectory for transitioning the polyphase machine from the first torque level to the second torque level; and
   providing pulsed torque signals to provide a pulsed periodic torque operation between a first torque level and a second torque level, wherein the pulsed periodic torque operation has a period of less than one second.

19. The method, as recited in claim 18, wherein the first and second torque levels and period provide an overall average system output having a higher energy conversion efficiency during the pulsed periodic torque operation of the polyphase machine than the polyphase machine would have when operated at a third torque level that would be required to drive the polyphase machine in a continuous manner to deliver the same average output.

20. The method, as recited in claim 19, wherein the period is a period that provides reduced noise, vibration, and hardness.

* * * * *